United States Patent [19]

Pertramer

[11] Patent Number: 5,092,582
[45] Date of Patent: Mar. 3, 1992

[54] SPORTING AND EXERCISE APPARATUS

[76] Inventor: Oswald Pertramer, Kravolglstr. 6, I-39020, Marling, Italy

[21] Appl. No.: 732,085

[22] Filed: Jul. 18, 1991

Related U.S. Application Data

[62] Division of Ser. No. 467,494, Jan. 19, 1990, Pat. No. 5,050,864.

[30] Foreign Application Priority Data

Jan. 20, 1989 [DE] Fed. Rep. of Germany ....... 3901642
Oct. 5, 1989 [DE] Fed. Rep. of Germany ....... 3933280

[51] Int. Cl.$^5$ .............................................. A63B 21/00
[52] U.S. Cl. ...................................... 272/73; 272/70; 272/114; 280/248
[58] Field of Search ...................... 272/30, 33 R, 33 A, 272/34 A, 39, 43, 44, 70, 72, 73, 114, 69, 97; 280/220, 224, 244–258

[56] References Cited

U.S. PATENT DOCUMENTS

| | | |
|---|---|---|
| 433,720 | 8/1890 | Chase .................................. 280/244 |
| 1,276,168 | 8/1918 | Buchholz . |
| 1,598,788 | 9/1926 | Sinderson . |
| 1,611,590 | 12/1926 | Johnson ........................... 280/248 X |
| 2,085,657 | 6/1937 | Heisdorf . |
| 4,084,836 | 4/1978 | Lohr .................................. 280/257 X |
| 4,509,742 | 4/1985 | Cones . |
| 4,712,790 | 12/1987 | Szymski . |
| 4,757,988 | 7/1988 | Szymski . |
| 4,828,284 | 5/1989 | Sandgren . |
| 4,848,736 | 7/1989 | Anderson ........................ 280/244 X |
| 4,871,164 | 10/1989 | Tseng . |
| 4,880,225 | 11/1989 | Lucas et al. . |

FOREIGN PATENT DOCUMENTS

| | | |
|---|---|---|
| 2742719 | 4/1978 | Fed. Rep. of Germany . |
| 3325577 | 7/1983 | Fed. Rep. of Germany . |
| 626410 | 9/1927 | France . |
| 40060 | 7/1963 | German Democratic Rep. . |
| 103145 | 7/1923 | Switzerland . |

Primary Examiner—Robert Bahr
Attorney, Agent, or Firm—Davis, Bujold & Streck

[57] ABSTRACT

The invention concerns a sporting and exercise apparatus movable by muscular force including a frame having for the user an elongated platform supported by at least two wheels and a mechanical hand lever-drive for converting a lever motion into a rotary motion of at least one of the wheels. The lever drive has at least one hand lever hinged on the frame and having a toothed segment interconnecting a first and a second rotatable shaft each having a first and a second gear in which each first gear is supported on the shaft by free wheel units and in which a drive pinion is fixedly connected to the second shaft so that either forward or rearward movement of the hand lever will actuate one of the first gears and impart drive torque in the direction of movement of the apparatus while the other first gears torque is limited due to the action of the corresponding free wheel unit.

7 Claims, 4 Drawing Sheets

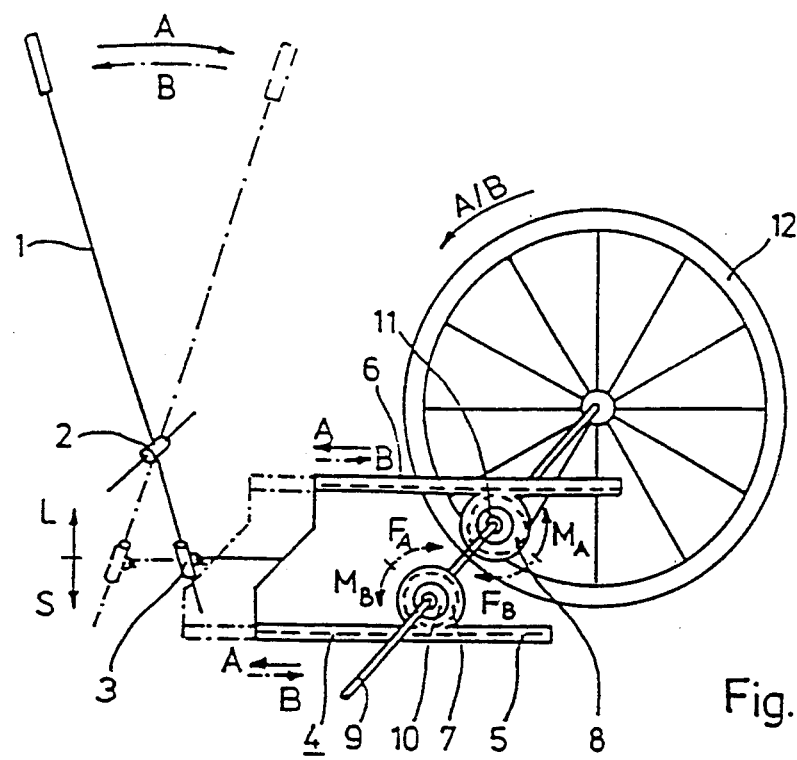
Fig. 1
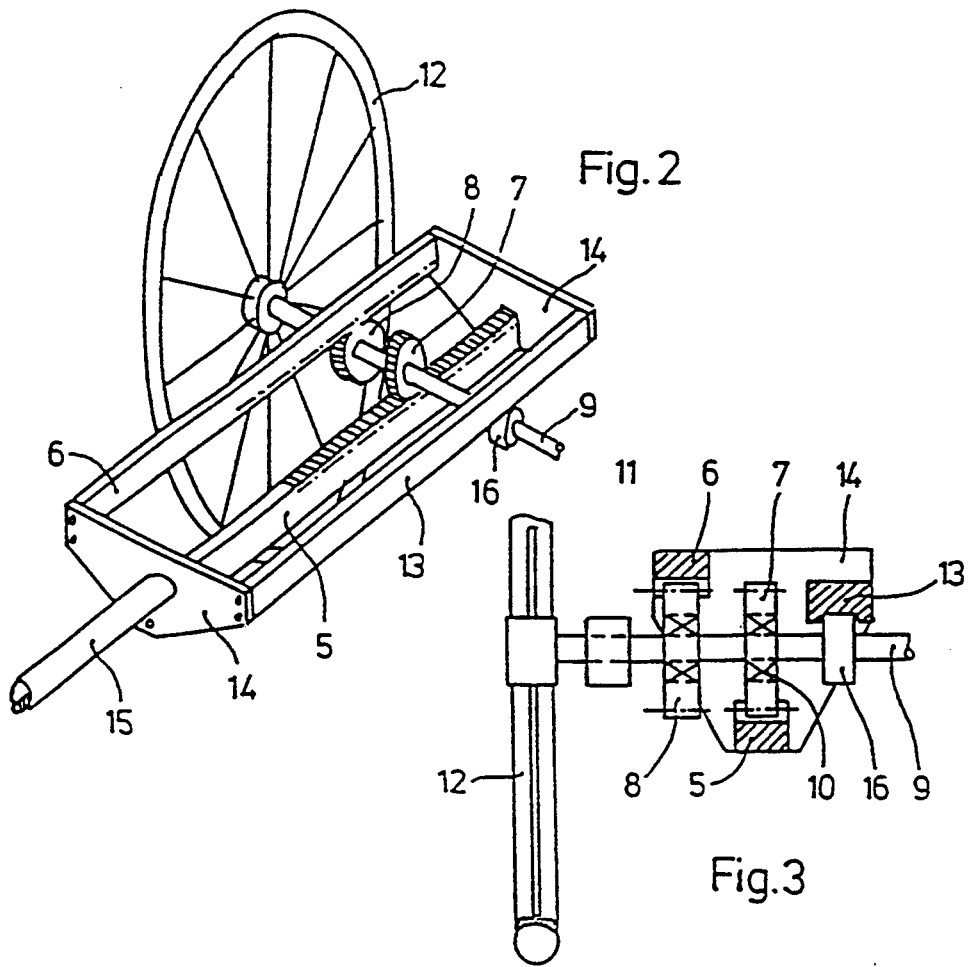
Fig. 2
Fig. 3

SPORTING AND EXERCISE APPARATUS

This is a divisional of copending application(s) Ser. No. 07/467,494 filed on 1/19/90 now U.S. Pat. No. 5,050,864.

The invention relates to a sporting and exercise apparatus movable by muscular force and including a frame having for the user an elongated platform, being supported on the ground by at least two wheels and having a mechanical hand-lever drive for converting a lever motion into a rotary motion of at least one of the wheels.

Already known are so-called scooters, specially for children, having a frame including an elongated platform which usually is supported on the ground by two wheels and a hand lever which is pivoted at the forward end of the platform, extends essentially upwardly to a horizontal guide bar with the lower end of the hand lever being connected with the front one of the wheels. The forward motion is achieved by muscular force, one foot of the user being on the platform and the other foot carrying out a continuous pushing movement on the ground. For steering purposes, the guide bar is pivoted about its longitudinal axis whereby the front wheel undergoes a corresponding steering angle change. The steering movement is supported by an inclination of the user to the side corresponding to the steering angle. Such a scooter is a relatively one-sided sporting apparatus, since here only one leg is constantly required while the other leg, the upper part of the body and the arms are hardly moved.

The problem to be solved by the invention is to provide a sporting and exercise apparatus which a user in upright position can move forward and in which, instead of the legs, the whole body, mainly the whole trunk muscles, but also the arm and leg muscles are used to produce the driving force.

The upright position is preferred, since it makes breathing easier compared to sitting on a bicycle.

Another problem to be solved by the invention is that of providing an apparatus that is both driven and steered by a harmonious movement of the whole body, thus improving the coordination of the movements of the body.

This is obtained by hand levers which drive in forward and backward movement, incline the platform on sidewise inclination and produce, by a steering mechanism, a steering angle proportional to the inclination of the lever.

Still another problem solved by the invention is that of converting into a propulsion of the apparatus, minimal forward and backward movements of the levers independently of each other with the least possible play while providing a constant transmission ratio over the whole path of the lever and the possibility of stopping at any point of the movement one or both levers without causing a braking of the apparatus.

Yet another problem solved is to provide a design of the drive that permits a separate control of the transmission ratio on both levers useful, for instance, for the rehabilitation of weakened muscles.

The invention will now be described in more detail, by way of example, with reference to the drawings, in which:

FIG. 1 is a diagrammatic view of a first embodiment of a hand-lever drive;

FIG. 2 is a rack-and-pinion drive for one axle half of the hand-lever drive shown in FIG. 1;

FIG. 3 is a cross-section through the rack-and-pinion drive of FIG. 2;

Figure 4:
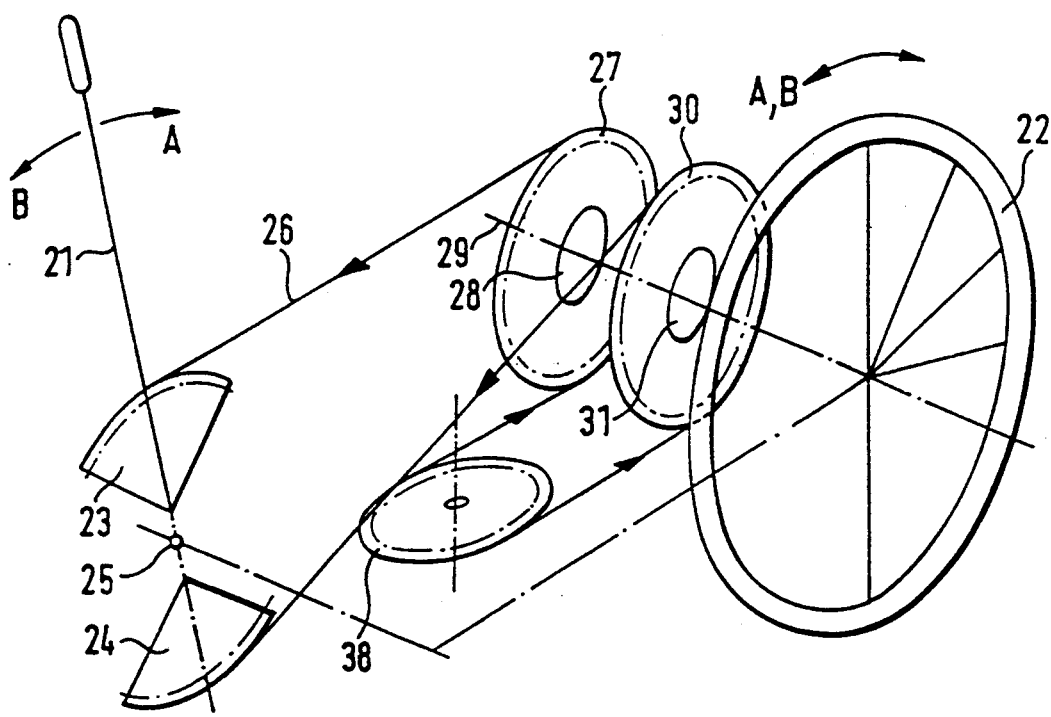
FIG. 4 is a diagrammatic view of a second embodiment of a hand-lever drive.

FIG. 1 shows a mechanical hand-lever drive having a hand lever 1 pivotally supported on a pin having a rotation axis 2 of the frame, there being provided a pivotal point 3 to which is connected a drive element 4 consisting of two racks 5, 6. Each rack is meshed with a gear 7, 8 which is connected with a drive axle 9 via a free-wheel unit 10, 11. Said free-wheel units 10, 11 provide locking in counterclockwise rotation and free wheeling in clockwise rotation of the connection between the gears 7, 8 and the axle 9 (as seen in FIG. 1). One rack 6 is situated above and the other rack 5 below the corresponding gear 7, 8 in order to effect movement, in counterclockwise direction (as seen in FIG. 1), of a track wheel 12 firmly connected with the axle 9 as the lever is moved to the rear and to the front.

A designates the direction of movement of the racks each time the hand lever is drawn to the back and B designates the direction of movement of the racks when the hand lever is pressed forward. $M_A$ and $M_B$ indicate here the locking in the direction A or B and $F_A$ and $F_B$ mean the free wheeling in the direction A or B.

To adjust the leverage or the consumption of energy in this embodiment, the pivotal point 3 at the lower end of the lever can be moved either toward the rotation axis 2 for a low speed L or a small consumption of energy or away from the rotation axis 2 for a higher speed S or a greater consumption of energy. It is also possible to move the pivotal axis 2 (sic) along the longitudinal axis of the hand lever 1 in addition or instead of moving pivot point 3.

In FIGS. 2 and 3 is shown a variant of the hand-lever drive shown in FIG. 1 in which both racks 5, 6 are firmly connected each by means of their forward and rear ends by one plate 14 which also support an added guide rail 13. On the forward plate is mounted a push-/pull rod 15 that leads to the pivotal point 3. The guide rail 13 guides a ball bearing 16 mounted on the axle 9 and with the former prevents the racks 5, 6 from tilting sideways.

Figure 5:
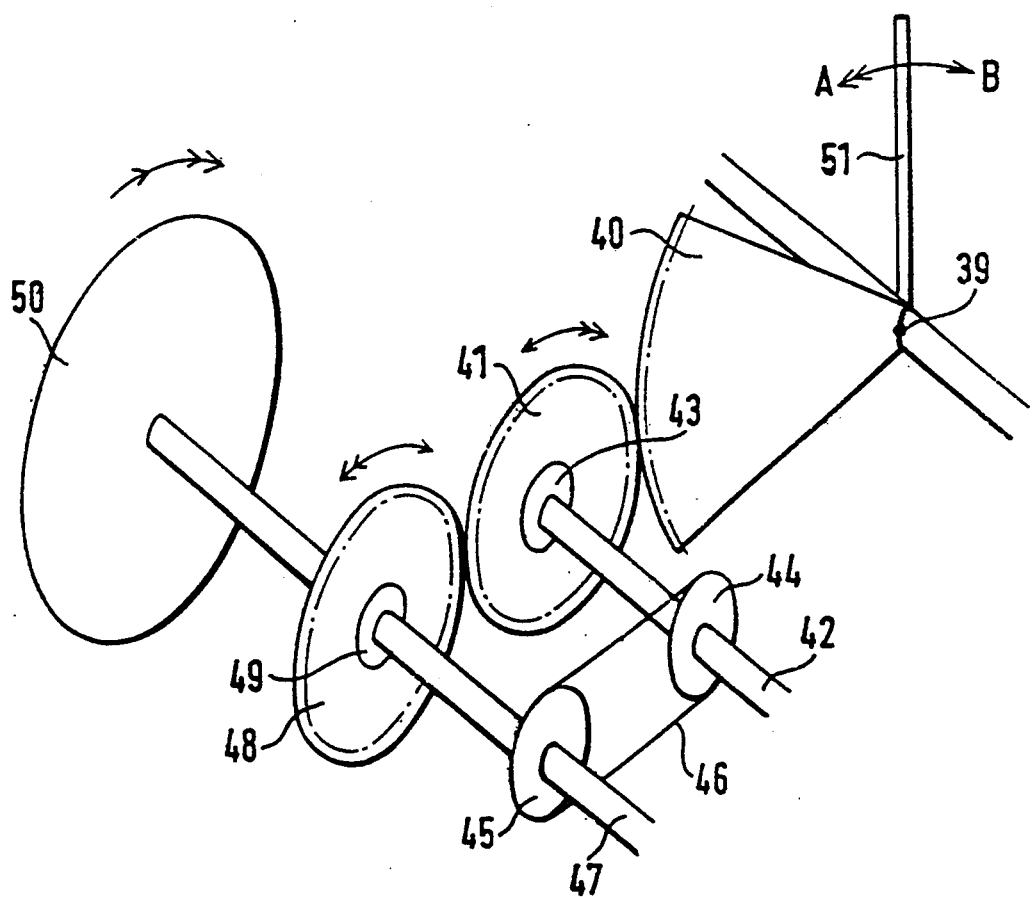
FIG. 5 is a diagrammatic view of a third embodiment of a hand-lever drive.

Such a hand-lever drive is adequate not only for a sporting and exercise apparatus, as shown in FIG. 5, but also for driving a wheel-chair; in the traditional drive of wheel-chairs there are used hand levers which act upon a crank of the drive axle via a rod. There is provided for each hand a hand lever which acts upon staggered cranks of the drive axle. At the same time both hand levers are only actuated in one direction, with the backstroke free via a free-wheel unit so that only half of the reciprocating movement is converted into a forward movement.

A use of a hand-lever drive shown in FIGS. 1 to 3 associated with a wheel-chair brings the advantage that a lever drive also takes place in reciprocating movements independently of the position of the lever.

FIG. 4 shows a second embodiment of a hand-lever drive according to the invention for converting a lever motion into a rotary motion.

In said figure, 21 designates a hand lever supported on a rotation axis 25 in the frame. On both sides of the rotation axis 25 the hand lever 21 is provided with opposed, symmetrically arranged wheel segments 23, 24 pivotable with the hand lever 21 about axis 25. Seen in travel direction, behind the hand lever 21 and below the platform (not shown in FIG. 4) is provided a shaft 29 on which two gears 27, 30 are supported each via a free-wheel unit 28, 31, said free-wheel units 28, 31 operating, the same as in the first embodiment, a counterclockwise rotating drive or a clockwise rotating free wheel (as seen in FIG. 4) connected between the gears 27, 30 and the shaft 29. For this purpose both wheel segments 23, 24 are connected by means of a chain 26 the two ends of which are secured to the respective front ends of the wheel segments 23, 24. Departing from the upper toothed segment 23, the chain 26 engages first the gear 27, then passes over a guide roller 38, freely rotatable in both directions and secured to the frame, and then engages the second gear 30 before extending to the lower wheel segment 24. The direction in which the gears 27, 30 are engaged is selected is opposite one another so that pushing lever 21 in direction B drives, the wheel 22 is fixed on shaft 29 by way of gear 27 and pulling lever 21 in direction A drives that wheel 22 by way of gear 30, the direction of wheel drive being clockwise (as seen in FIG. 4).

Instead of a wheel 22, it is also possible to provide a drive wheel for driving a wheel-chair, for instance. But if the hand-lever drive shown in FIG. 4 serves to drive the sporting and exercise apparatus shown in FIG. 6, then the wheel 22 can be directly connected by means of an endless chain with the drive wheel 33 (FIG. 6) or be connected with a gear provided between the shaft 29 and the drive wheel 33, which gear is connected via another endless chain with the axle of the rear drive wheel 33. Depending on the selected diameter of the gears, this allows a graduation of the transmission ratios. The drive wheel 33 can be advantageously provided with a multiple hub control actuated by a Bowden wire (not shown) which traverses the underside of the frame and extends upwardly on the hand lever 21 or 21'. In addition the sporting and exercise apparatus of FIG. 6 is provided with a hand brake likewise not shown which is also secured to the upper end of one of the hand levers 21, 21'.

Figure 6:
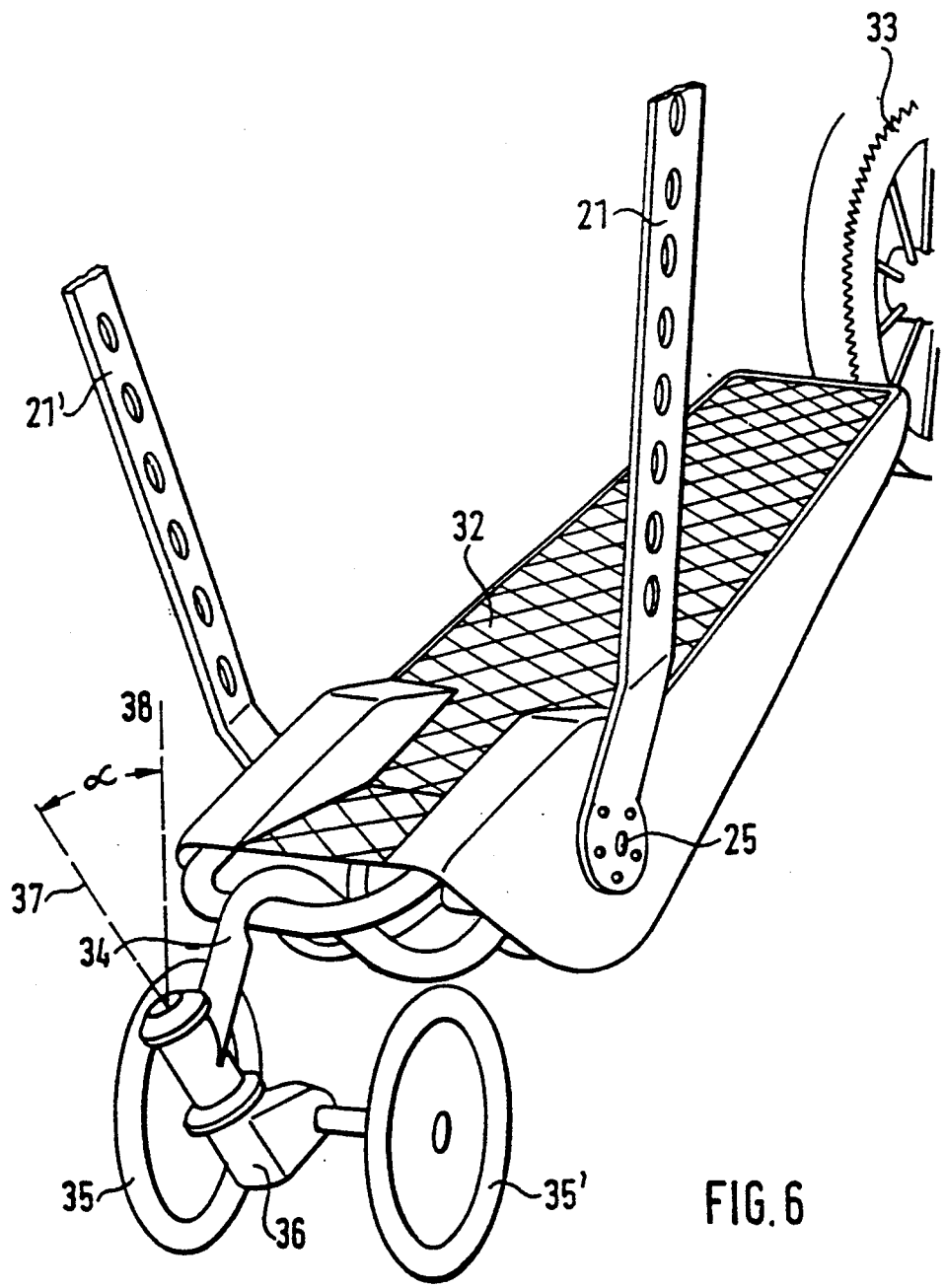
FIG. 6 is a perspective view of a sporting and exercise apparatus according to the invention.

In FIG. 6 is in addition designated with 32 the platform that carries the user. Instead of a single hand lever (according to FIG. 1) there are provided here two hand levers 21, 21' which are secured to the frame on the axis of rotation 25. Each hand lever is provided with a lever drive as shown in FIG. 4, that is, with two toothed segments, and a chain drive with two gears having free-wheel units and a guide roller. This means that both hand levers 21, 21' are movable either simultaneously in the same direction or opposite to one another. It is further also possible to provide on the shaft 29 two separate wheels 22, each one being actuatable by only one of the two hand levers 21, 21'.

Two front wheels 35, 35' situated parallel with each other together with the drive wheel 33 support the frame on the ground. The front wheels 35, 35' are free-rotatably supported on a connecting axle and connected with the frame via a guide 36, the guiding pivot axis 37 for the axle of which forms with the vertical, a castor angle α specifically in a vertical plane in which lies the longitudinal axis of the frame. The angle α can be altered in a specially preferred embodiment by an adjustment of the guide 36. Said angle α is advantageously on the order of from 5° to 50°. Here sideways inclination of the levers 21, 21' and the frame produce a desired steering action about axis 37.

In FIG. 5 is shown a third embodiment of a hand-lever drive according in the invention such as for the sporting and exercise apparatus shown in FIG. 6.

Here, hand lever 51 which is pivotable, about an axis transverse of the apparatus, in both directions, at rotation axis 39. Attached to the lower end of the hand lever 51 is a toothed segment 40 which lies in the longitudinal vertical plane of the apparatus and whose toothed outer edge meshes with a gear 41 secured via a free-wheel unit 43 to an intermediate shaft 42. The gear 41 meshes with a second gear 48 which is connected via a free-wheel unit 49 with a second shaft 47 upon which is secured the drive wheel 50 for driving the sporting and exercise apparatus. Parallel with the two gears 41, 48 are two other gears (third and fourth gears, respectively) 44, 45 fixedly mounted on the respective shaft 42 or 47 and interconnected via an endless chain 46.

In this embodiment, the drive pinion 50 on the shaft 47 be driven in the same direction, as indicated by the single arrow or double arrow with both the forward motion B and the backward motion A of the hand lever 51. In a backward motion A, the toothed segment 40 is lowered and thus drives the gear 41 in direction of the double arrow. The gear 41 meshes with the second gear 48 which is driven in opposite direction. Since this direction of rotation is opposite to the desired direction of rotation of the pinion 50, the gear 48 in this motion runs over the free-wheel unit 49 without applying torque to the shaft 47 whereas the rotation motion originating from the toothed segment and transmitted to the gear 41 is transmitted to the shaft 47 and by the two gears 44, 45 that are firmly connected with their shafts and the endless chain 46, and thus serves to drive the wheel 50 in direction of the double arrow. With movement of the hand lever 51 in direction B, the toothed segment 40 is lifted and drives the gear 41 in direction of the single arrow with the gear 48 then being driven in the opposite direction, the free-wheel unit 49 of the gear 48 being now disengaged and the torque being directly transmitted to the pinion 50 via the drive 40, 41, 48. The free-wheel unit 43 of the gear 41 is operative in this direction of rotation so that the shaft 42 can rotate in opposite direction to the gear 41 by virtue of the gears 44, 45 and the chain drive 46.

I claim:

1. A sporting and exercise apparatus movable by muscular force comprising a frame for accommodating a user, at least one driven member attached to said frame and a hand lever drive supported by said frame, for converting lever motion into rotary motion of the at least one driven member, wherein the hand lever drive comprises at least one hand lever (51) which is hinged to the frame and pivotable about an axis of rotation, and in which said hand lever drive further includes a first shaft (42) rotatably supported parallel with and adjacent the axis of rotation with first (41) and third (44) gears supported thereon and a second shaft (47) rotatably supported parallel with and adjacent said first shaft and having a second gear (48) and a forth gear (45) supported thereon, with said at least one driven member (50) firmly connected to said second shaft, said first gear (41) is supported on said first shaft (42), via a free wheel unit (43), and said third gear (44) is fixedly connected to the first shaft, said second gear (48) is supported on said second shaft (47), via a free wheel unit (49), and said forth gear (45) is fixedly connected to the second shaft (48), said hand lever (51) is drivingly connected to said first gear (41), said first and second gears are in meshing engagement with one another and a driving mechanism interconnects said third and forth gears to provide a drive therebetween, whereby movement (B) of said hand lever (51) in one direction conveys driving power to said at least one driven member (50) via said first gear (41), said second gear (48) and said second shaft (47) while movement (A) of said hand lever (51) in an opposite direction conveys driving power to said at least one driven member (50) via said first gear (41), said first shaft (42), said third gear (44), said driving mechanism, said forth gear (45) and said second shaft (47).

2. An apparatus according to claim 1, wherein the movement (B) of said hand lever (51) in the one direction causes said first gear (41) to free wheel about its free wheel unit (43) while the movement (A) of said hand lever (51) in the opposite direction causes the said first gear (41) to rotate said first shaft (42) and convey driving power via the drive mechanism of said third and fourth gears to said at least one driven member (50) while the second gear (48) free wheels about its free wheel unit (49).

3. An apparatus according to claim 1, wherein a segment (40), having a gear-tooth surface, attached to said hand lever (51) provides driving power from said hand lever (51) to said first gear (41), and said segment (40), said first gear (41) and said second gear (48) all lie in a plane.

4. An apparatus according to claim 1, wherein said driving mechanism is an endless chain (46).

5. An apparatus according to claim 1, wherein said at least one driven member (50) is a drive pinion.

6. An apparatus according to claim 1, wherein said frame further includes a platform for supporting the user and at least one freely rotatable front wheel for steering said apparatus.

7. An exercise apparatus movable by muscular force comprising a frame having a platform, for accommodating a user, at least two wheels attached to and supporting said frame, at least one wheel of which is driven, and a hand lever drive supported by said frame, for converting lever motion into rotary motion of the at least one driven wheel, wherein the hand lever drive comprises at least one hand lever (51) which is hinged to the frame and pivotable about an axis of rotation, and in which said hand lever drive further includes a first shaft (42) rotatably supported parallel with and adjacent the axis of rotation with a first gear (41) and a third gear (44) supported thereon and a second shaft (47) rotatably supported parallel with and adjacent said first shaft and having a second gear (48) and a forth gear (45) supported thereon, with said at least one driven wheel (50) firmly connected to said second shaft, said first gear (41) is supported on said first shaft (42), via a free wheel unit (43), and said third gear (44) is fixedly connected to the first shaft, said second gear (48) is supported on said second shaft (47), via a free wheel unit (49), and said forth gear (45) is fixedly connected to the second shaft (48), said hand lever (51) is drivingly connect to said first gear (41), said first and second gears are in meshing engagement with one another and a driving mechanism interconnects said third and forth gears to provide a drive therebetween, whereby movement (B) of said hand lever (51) in one direction causes said first gear (41) to free wheel about its free wheel unit (43) and conveys driving power to said at least one driven wheel (50) via said first gear (41), said second gear (48) and said second shaft (47) while movement (A) of said hand lever (51) in an opposite direction causes said second gear (48) to free wheel about it free wheel unit (49) and conveys driving power to said at least one driven wheel (50) via said first gear (41), said first shaft (42), said third gear (44), said driving mechanism, said forth gear (45) and said second shaft (47).

* * * * *